(12) United States Patent
Roh

(10) Patent No.: US 7,805,938 B2
(45) Date of Patent: Oct. 5, 2010

(54) SYSTEM AND METHOD FOR CONTROLLING MINIMUM FLOW RATE OF VARIABLE GEOMETRY TURBOCHARGER

(75) Inventor: Young Jun Roh, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 515 days.

(21) Appl. No.: 11/925,428

(22) Filed: Oct. 26, 2007

(65) Prior Publication Data

US 2008/0110169 A1 May 15, 2008

(30) Foreign Application Priority Data

Nov. 1, 2006 (KR) ................ 10-2006-0107054

(51) Int. Cl.
*F02D 23/00* (2006.01)
*F04D 29/44* (2006.01)
*F02B 37/00* (2006.01)
*F02B 37/22* (2006.01)
*F02B 37/24* (2006.01)

(52) U.S. Cl. ............... 60/602; 415/160; 477/32

(58) Field of Classification Search .......... 60/602; 415/159–163; 477/32
See application file for complete search history.

(56) References Cited

U.S. PATENT DOCUMENTS

| | | | | |
|---|---|---|---|---|
| 5,184,526 A * | 2/1993 | Watanabe | | 477/31 |
| 5,233,888 A * | 8/1993 | Fukuda | | 477/30 |
| 5,782,092 A * | 7/1998 | Schultalbers et al. | | 60/602 |
| 6,067,798 A * | 5/2000 | Okada et al. | | 60/602 |
| 6,652,414 B1 * | 11/2003 | Banks, III | | 477/32 |
| 6,669,442 B2 * | 12/2003 | Jinnai et al. | | 415/160 |
| 6,681,575 B2 * | 1/2004 | Dellora et al. | | 60/602 |
| 6,692,406 B2 * | 2/2004 | Beaty | | 477/32 |
| 6,699,010 B2 * | 3/2004 | Jinnai | | 60/602 |
| 6,736,595 B2 * | 5/2004 | Jinnai et al. | | 60/602 |
| 6,990,813 B2 * | 1/2006 | Ando et al. | | 60/602 |
| 7,024,856 B2 * | 4/2006 | Ando et al. | | 60/602 |
| 7,065,966 B2 * | 6/2006 | Yamada et al. | | 60/602 |
| 7,137,252 B2 * | 11/2006 | Ando et al. | | 60/602 |
| 7,171,292 B2 * | 1/2007 | Bellinger et al. | | 701/29 |

FOREIGN PATENT DOCUMENTS

DE 102004058719 A1 * 6/2006

(Continued)

*Primary Examiner*—Thai Ba Trieu
(74) *Attorney, Agent, or Firm*—Morgan, Lewis & Bockius LLP

(57) ABSTRACT

The present invention relates to a system and method for controlling a minimum flow rate of a variable geometry turbocharger that improve the starting performance of a vehicle and prevent the generation of surge noise and smoke remarkably, comprising a stopper to restrict the lever rotation of a flow regulator and determine a minimum flow rate of the turbocharger based on the position that restricts the lever rotation, in a structure where its position can be regulated to control the lever rotation limit position and the minimum flow rate of the turbocharger, and an ECU to calculate a stopper position correction value, with which an actual boost pressure detected by a boost pressure detection unit satisfies a target boost pressure, if meeting predetermined vehicle speed and gear ratio conditions, and then to duty-control a stopper position regulator to correct the current stopper position by the calculated stopper position correction value.

10 Claims, 11 Drawing Sheets

FOREIGN PATENT DOCUMENTS

| | | | | |
|---|---|---|---|---|
| JP | 01271616 A | * | 10/1989 | |
| JP | 10-037754 | | 2/1998 | |
| JP | 10331650 A | * | 12/1998 | |
| JP | 2001-003757 | | 1/2001 | |
| JP | 2002-119092 | | 4/2002 | |
| KR | 2003039010 A | * | 5/2003 | |
| KR | 10-2005-0026854 | | 3/2005 | |
| KR | 2006071777 A | * | 6/2006 | |
| KR | 783848 B1 | * | 12/2007 | |
| KR | 2008053612 A | * | 6/2008 | |

\* cited by examiner

Prior Art

Prior Art

SYSTEM AND METHOD FOR CONTROLLING MINIMUM FLOW RATE OF VARIABLE GEOMETRY TURBOCHARGER

CROSS-REFERENCE TO RELATED APPLICATION

This application claims the benefit of Korean Patent Application No. 10-2006-0107054, filed on Nov. 1, 2006, the entire disclosure of which is hereby incorporated by reference.

BACKGROUND OF THE INVENTION

1. Field of the Invention

The present invention relates to a system and method for controlling a minimum flow rate of a variable geometry turbocharger and, more particularly, to a system and method for controlling a minimum flow rate of a variable geometry turbocharger that can improve the starting performance of a vehicle and prevent the generation of surge noise and smoke remarkably, compared with the convention system in which the position of a stopper is fixed hardwarely, by configuring the system capable of adjusting the position of the stopper to satisfy a target boost pressure under fixed conditions.

2. Description of Related Art

Recently, a variable geometry turbocharger (VGT) has been widely applied to a diesel engine in order to achieve high-output and low-pollution.

The variable geometry turbocharger has been developed for providing high torque and high power and, at the same time, for obtaining a sufficient torque margin at low speed compared with the conventional waste gate turbocharger (WGT) by variably applying the passage area of exhaust gas introduced in a turbine.

In the variable geometry turbocharger as depicted in FIG. 1, in order to maximally ensure the amount of air in a low load region that is insufficient in the conventional waste gate turbocharger, vanes are adjusted to minimize the flow area in a low speed region and maximize the flow area in a high speed region, thus increasing the responsiveness in the low speed and low load region and also reducing the exhaust gas by ensuring a sufficient amount of air.

The variable geometry turbocharger will be described with reference to FIGS. 2 to 6 as follows.

As depicted in the figures, the variable geometry turbocharger comprises a compressor 10, a turbine 11 and a flow regulator 12 disposed therebetween for regulating the flow of exhaust gas.

The flow regulator 12 regulates the angle positions of vanes 16 to improve the flow performance of the exhaust gas and comprises a unison ring 14 established in a housing 13 of the turbine 11, a plurality of vanes 16 and a disk 17, established on one side of the unison ring 14 at regular intervals and moved within the range that they are not in contact with a turbine wheel 15, a bushing 18 and a lever 19 that operate the vanes 16 and the disk 17, and an actuator 21 connected to the lever 19 through a actuator rod 20 and operated by vacuum pressure.

Reference numeral 22 denotes a link, of which one end is supported to the unison ring 14 and the other end is connected to the vane 16 to be operated with the vane 16.

Moreover, a screw (bolt) type stopper 23 restricting the displacement of the actuator rod 20 is provided in the housing 13. Here, the lever 19, connected to a front end of the actuator rod 20 with a pin (not shown), comes in contact with the stopper 23 and the stopper 23 restricts the rotation of the lever 19 and the movement of the actuator rod 20, thus setting a minimum flow rate of the turbocharger.

Like this, if the actuator rod 20 moves back and forth, the disk 17 rotates centering on an axis thereof by the lever 19 and the bushing 18. Accordingly, the angle of the vane 16 can be varied through the link 22, of which one end is supported to the unison ring 14.

That is, the operation angle of the vanes 16 is set most suitably by the actuator 21 using vacuum pressure in the variable geometry turbocharger.

The optimum position of the vanes under the various driving conditions is determined according to map information of ECU; however, the minimum angle of the vanes 16 is determined by the mechanical stopper 23 at an early stage.

As one of the matching items in the development process, the position of the stopper preset by an engine developer is measured by a VGT maker using a master VGT to mass produce the VGTs.

Meanwhile, according to the variable geometry turbocharger as described above, it is possible to increase the amount of intake air by controlling the cross sectional area of a turbine entrance to maximize the energy efficiency without the increase of exhaust gas, thus obtaining higher output power. Such increase in the output power can inhale a greater deal of air in the same load and, thereby, prevent the generation of undesirable components of incomplete combustion such as exhaust fumes (PM) caused by the insufficient air.

Moreover, it is possible to ensure an exhaust gas margin by the reduction of the exhaust fumes (NOx/PM Trade-Off) and increase the excess force of the vehicle by the increased engine power, thus providing better fuel efficiency under the same load conditions.

FIG. 1 shows an example of the position control of vanes according to the driving regions. As depicted in the figure, if the vanes are closed in a low speed region, it is possible to provide an increase in the torque in the low speed region and an improvement in the responsiveness through the increased boost pressure, thus improving the starting performance of the vehicle. Whereas, the vanes are opened in a high speed region to increase the exhaust flow and thereby improves the output power.

The control of the variable geometry turbocharger generally complies with a PID control, and the behavior of the actuator that controls the vanes is determined by the vacuum pressure output through a solenoid valve controlled by regulating the opening and closing duty ratio of PWM, if ECU receives signals from the respective sensors, such as an air flow sensor, a boost pressure sensor, a water temperature sensor, etc., and outputs control signals.

Here, the control signals of ECU are determined by a difference calculated by comparing a target boost pressure with an actual boost pressure detected by the boost pressure sensor based on input values from the various sensors.

A major factor that determines the increase in the torque in the low speed region and the improvement in the responsiveness, which are the major characteristics of the variable geometry turbocharger, is to determine the minimum flow rate when the nozzle area is minimum, that is, to determine the minimum area of the path, through which the exhaust gas passes, as shown in the top left of FIG. 1.

As described above, the rotational movement of the vanes 16 is made when the actuator rod 20, connected to the unison ring 14 rotating the vanes 16, the bushing 18 and the lever 19 in turn, moves back and forth. The minimum area of the vanes 16 is determined through a test by regulating the position of the screw (bolt) type stopper 23 to satisfy a target boost pressure in the low speed (generally, less than 1,000 rpm) full load region.

That is, the minimum flow point of the variable geometry turbocharger is determined by the screw type stopper hardwarely and it is impossible to regulate the minimum flow point by ECU having the PID control algorithm.

The method for setting the minimum flow rate determined through the test sets the front and rear positions of the stopper 23 to obtain a target boost pressure at a point (hereinafter, referred to as a minimum flow region) where the lever 19 is in contact with the stopper 23 and then fixes the stopper 23 using a fixing nut.

The minimum flow rate set like this is a very important factor that affects the vehicle starting performance and the generation of surge noise and smoke but it causes numerous problems in the conventional method since it is restricted hardwarely by the stopper position.

It is advantageous to reduce the minimum flow rate for the improvement of the vehicle starting performance but if adjusted below an optimum flow rate, the surge noise is generated and the harmful exhaust gas such as smoke is increased.

Since the minimum flow region is the minimum area of the vanes, where the actuator lever comes in contact with the stopper hardwarely, the actual boost pressure cannot meet the target boost pressure, even if a signal of a maximum duty is output in case of the PID control.

In the conventional art, the flow range in the minimum flow region has been controlled to be within a specific deviation range through a part test by the variable geometry turbocharger maker; however, even if it is within the deviation range, the minimum flow rate in the actual engine has many deviations due to the limitations in the part test.

Moreover, abrasions in the connection portion between the vanes and the actuator and in the stopper occur with the increase in the driving time to vary the minimum flow rate, thus resulting in various problems of the deterioration of vehicle starting performance (if the minimum flow rate is greater than an optimum value), the generation of surge noise and excessive smoke (if the minimum flow rate is smaller than the optimum value), etc.

FIGS. 7 and 8 are graphs for illustrating the problems in accordance with the conventional art, in which FIG. 7 shows boost pressure characteristic deviations according to minimum flow deviations for an engine and FIG. 8 shows boost pressure characteristic deviations according to minimum flow deviations in a vehicle.

Referring to those figures, since the boost pressure is always insufficient against a target value due to the response delay of the turbocharger in an initial starting phase, the vehicle would be driven under the circumstances in that the PID duty is in the maximum and the vanes are in the minimum cross sectional areas, i.e., at the minimum flow rate.

Here, if the minimum flow rate is excessive, the boost formation is delayed in preparation for an optimum matching state, which may result in the deterioration of vehicle starting performance and the excessive generation of smoke.

Moreover, if the minimum flow rate is too little, the initial boost formation exceeds a target boost pressure, which may result in turbo damage due to the excess of speed endurance limit caused by the over boost.

Here, if the accelerator pedal is suddenly released, while the boost pressure is high, it enters a compressor surge region as the amount of air is suddenly reduced (where it becomes unstable by flow separation and reverse flow due to the lack of air, while the compressor rotational speed is high), thus causing heavy noise.

Since the respective variables of the PID control are optimized for the optimum matching state, it is impossible to overcome the hardware limitations even with the PID control.

Accordingly, it is necessary to solve the problems of the deterioration of vehicle starting performance and the generation of noise, etc., caused by the characteristic variations of the boost pressure formation due to the difference in the boost pressure formations between the part and the actual engine and the abrasions with the passage of driving time.

SUMMARY OF THE INVENTION

The present invention has been contrived taking the above-described circumstances into consideration and, is directed to provide a system and method for controlling a minimum flow rate of a variable geometry turbocharger that can improve the starting performance of a vehicle and prevent the generation of surge noise and smoke remarkably, compared with the convention system in which the position of the stopper is fixed hardwarely, by configuring the system capable of adjusting the position of the stopper to satisfy a target boost pressure under fixed conditions.

To accomplish this improvement, a system for controlling a minimum flow rate of a variable geometry turbocharger is provided in accordance with an aspect of the present invention comprising: a stopper established in a structure where its position can be adjusted to restrict a lever rotation of a flow regulator to determine a minimum flow rate of a turbocharger according to a position that restricts the lever rotation, and to restrict the lever rotation and the minimum flow rate of the turbocharger; a vehicle speed detection unit detecting a driving speed of a vehicle; a gear ratio detection unit detecting a gear ratio of the vehicle; a boost pressure detection unit detecting a boost pressure; an ECU calculating a stopper position correction value based on signals input from the vehicle speed detection unit, the gear ratio detection unit and the boost pressure detection unit and pre-stored data, and outputting a control signal for correcting the current stopper position by the calculated stopper position correction value, thus controlling the minimum flow rate of the turbocharger; and a stopper position regulator regulating the position of the stopper according to the control signal of the ECU.

Here, the stopper position regulator includes an actuator regulating the position of the stopper as a back and forth movement of an actuator rod thereof is controlled.

Moreover, the actuator is a vacuum pressure operation type actuator, in which the back and forth movement of the actuator rod is controlled according to a state of vacuum pressure supplied through a vacuum pressure supply line from an external vacuum pressure supply means, and the vacuum pressure supply line includes a solenoid valve established to control the state of vacuum pressure supplied to the actuator as its opening and closing degrees are controlled according to a control signal output from the ECU.

Furthermore, the stopper is coupled to a link connected to the actuator rod by a pin, a hinge pin of the actuator rod is rotatably connected to a slot formed on one side of the link, and the other end of the link is rotatably connected to a bushing established fixedly on one side of a turbocharger by means of the pin, the stopper being rotated centering on the pin connected to the bushing along with the link to regulate the stopper position during the back and forth movement of the actuator rod.

In addition, if a current vehicle speed and a gear ratio detected by the vehicle speed detection unit and the gear ratio detection unit satisfy predetermined vehicle speed and gear ratio conditions, the ECU calculates a difference between a predetermined target boost pressure corresponding to the vehicle speed and gear ratio conditions and an actual boost pressure detected by the boost pressure detection unit and then calculates a stopper position correction value for regulating the current stopper position to be a stopper position where the actual boost pressure meets the target boost pressure.

Moreover, the stopper position correction value is a value calculated by dividing the difference between the target boost pressure and the actual boost pressure by a stopper position correction constant, and the stopper position correction constant is a value obtained through a test and defined as a ratio of a boost pressure variation to a lever limit position variation of the stopper.

Furthermore, the ECU duty-controls the stopper position regulator based on the calculated stopper position correction value to correct the current stopper position by the calculated stopper position correction value.

To accomplish this improvement, a method is provided for controlling a minimum flow rate of a variable geometry turbocharger in accordance with an aspect of the present invention comprising the steps of: determining, at an ECU, whether a vehicle speed and a gear ratio detected by a vehicle speed detection unit and a gear ratio detection unit correspond to a minimum flow learning region satisfying predetermined conditions; calculating, at the ECU, a difference between a predetermined target boost pressure corresponding to the vehicle speed and gear ratio conditions and an actual boost pressure detected by the boost pressure detection unit, and then calculating a stopper position correction value for regulating the current stopper position to be a stopper position where the actual boost pressure meets the target boost pressure, if the ECU determines that the vehicle speed and the gear ratio correspond to the minimum flow learning region; outputting at the ECU, a control signal for correcting the current stopper position based on the calculated stopper position correction value; and regulating at the ECU, the stopper position by the stopper position correction value to control the minimum flow rate of the turbocharger as a stopper position regulator is operated and controlled by the control signal output from the ECU.

Here, the stopper position correction value is a value calculated by dividing the difference between the target boost pressure and the actual boost pressure by a stopper position correction constant, and the stopper position correction constant is a value obtained through a test and defined as a ratio of a boost pressure variation to a lever limit position variation of the stopper.

In addition, the ECU duty-controls the stopper position regulator based on the calculated stopper position correction value to correct the current stopper position by the calculated stopper position correction value.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will be described with reference to certain exemplary embodiments thereof illustrated the attached drawings which are given hereinbelow by way of illustration only, and thus are not limitative of the present invention, and in which.

Figure 1:
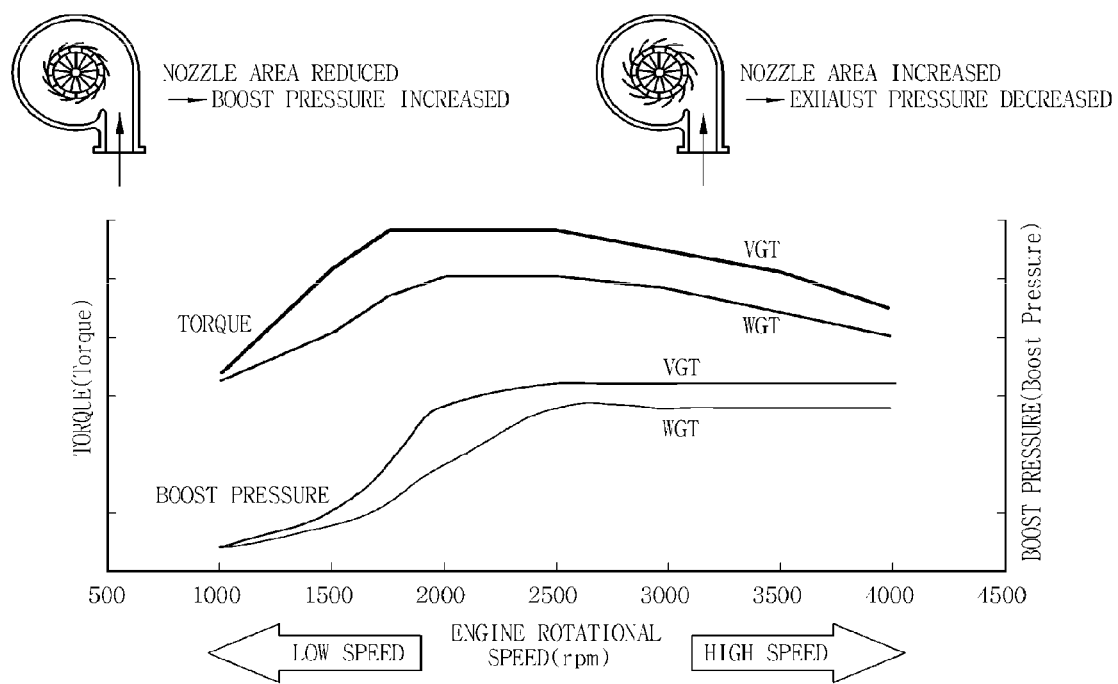
FIG. 1 shows control states of vanes according to driving regions of an engine in a conventional variable geometry turbocharger.
Figure 2:
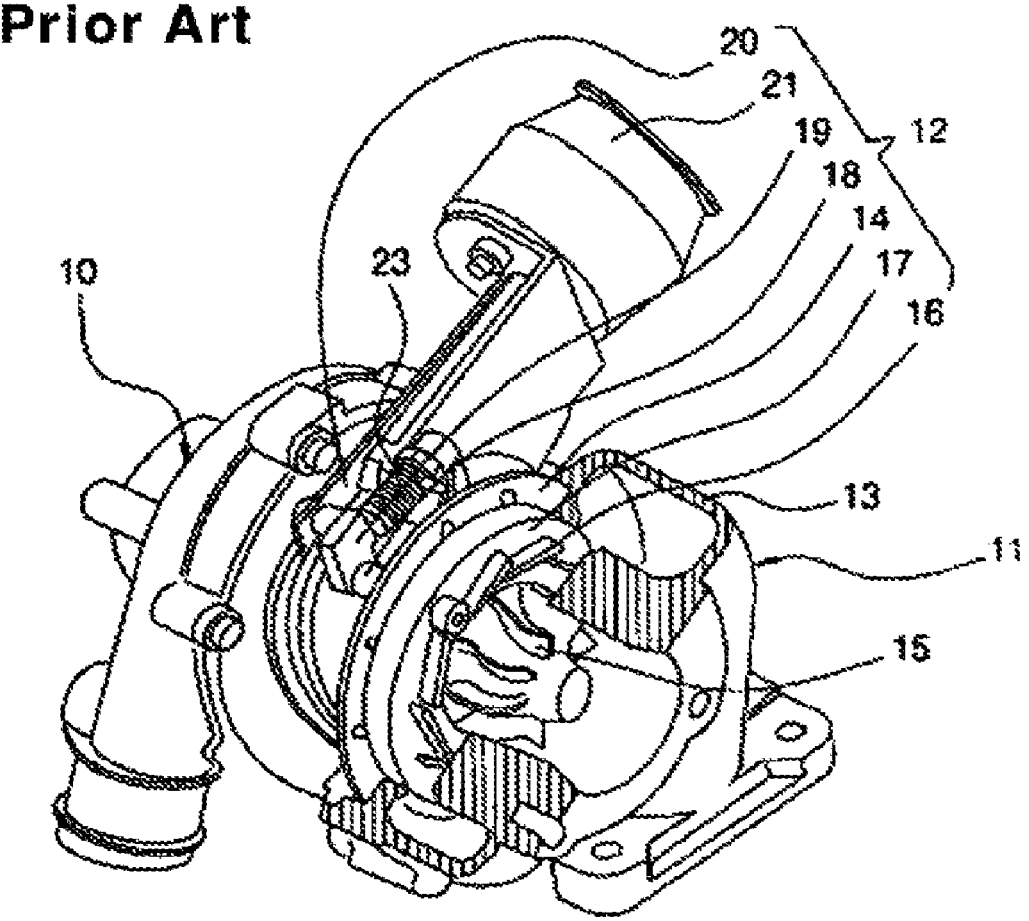
FIGS. 2 to 6 are perspective views depicting configurations of general variable geometry turbochargers.
Figure 3:
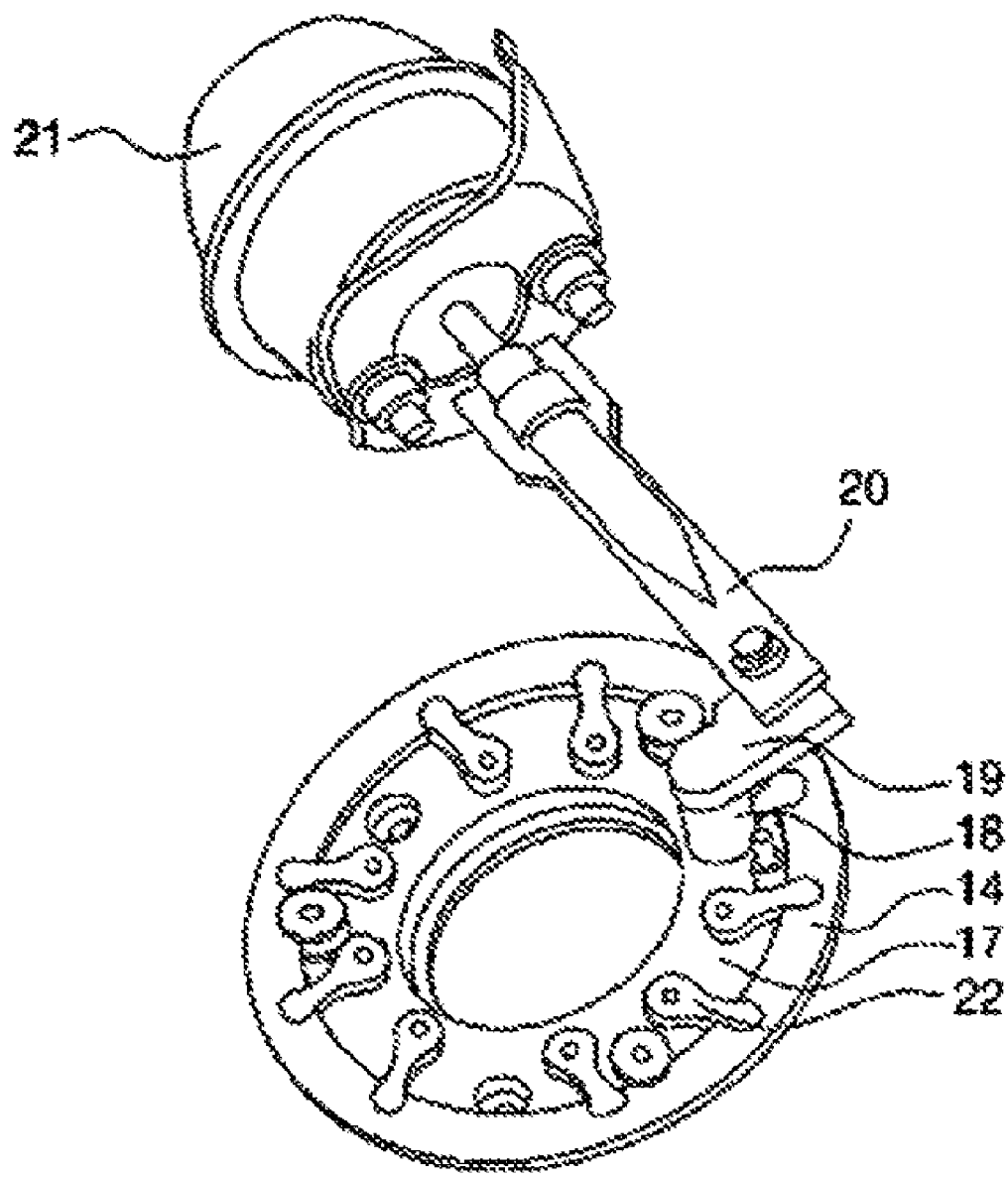
Figure 4:
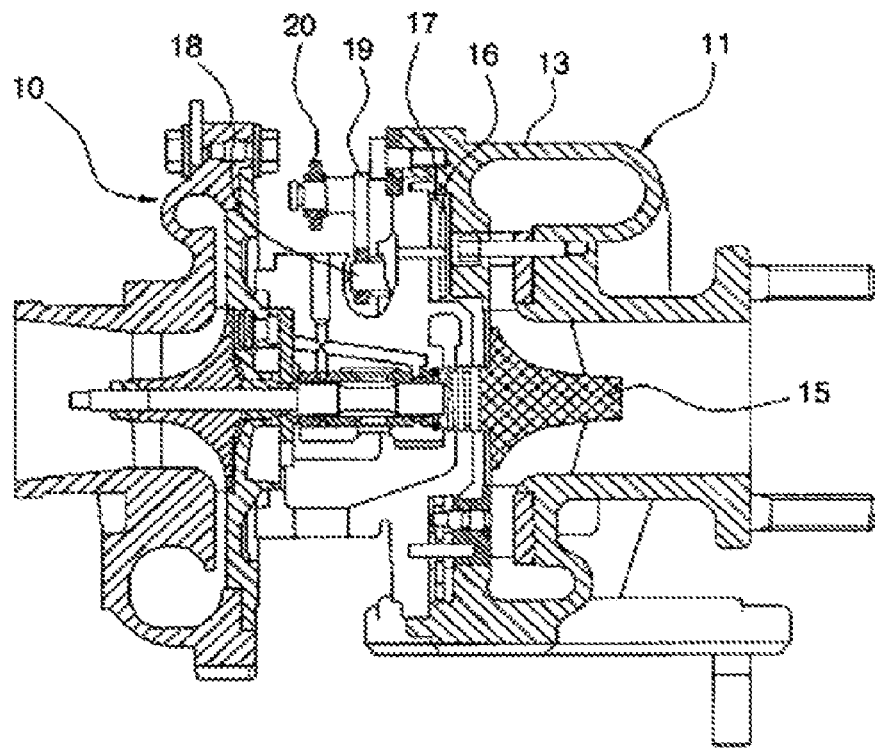
Figure 5:
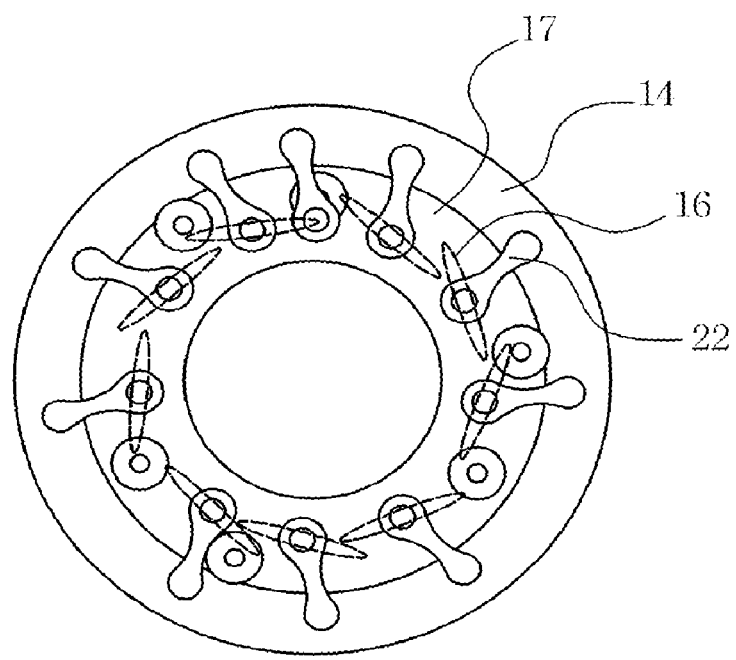
Figure 6:
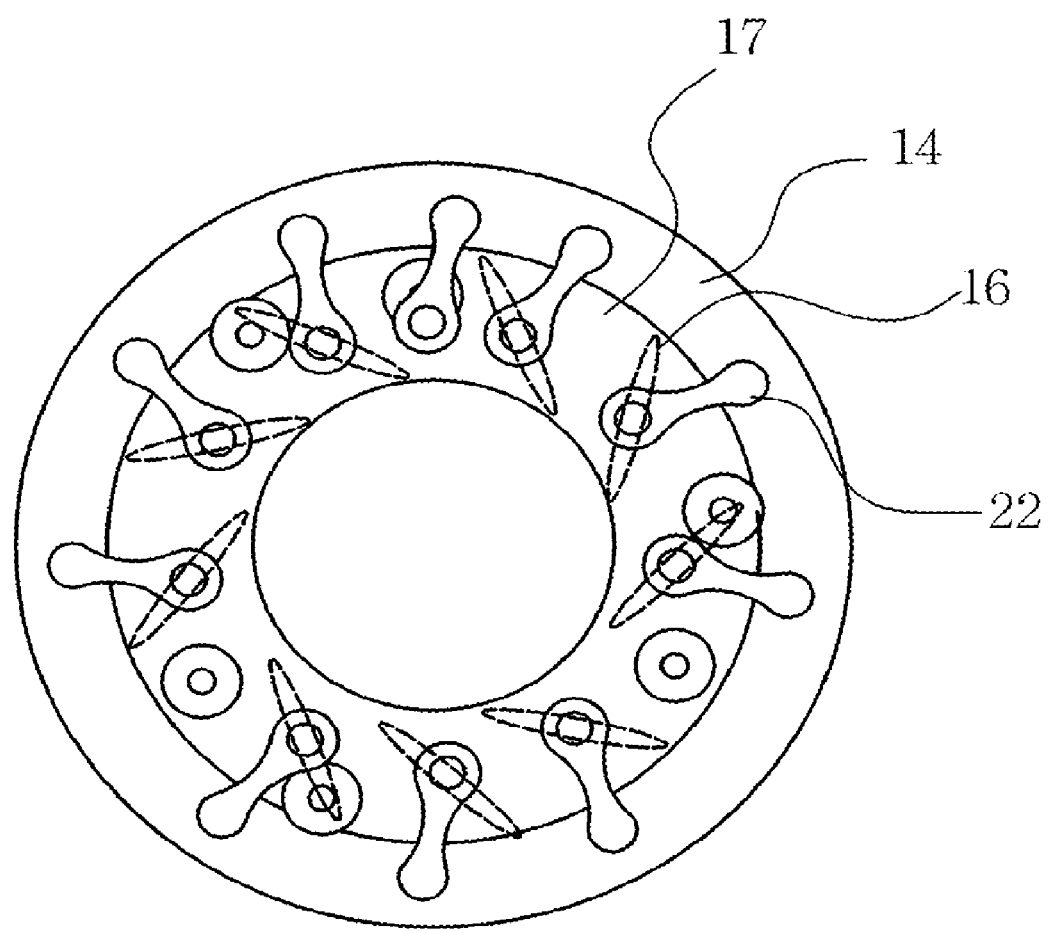
Figure 7:
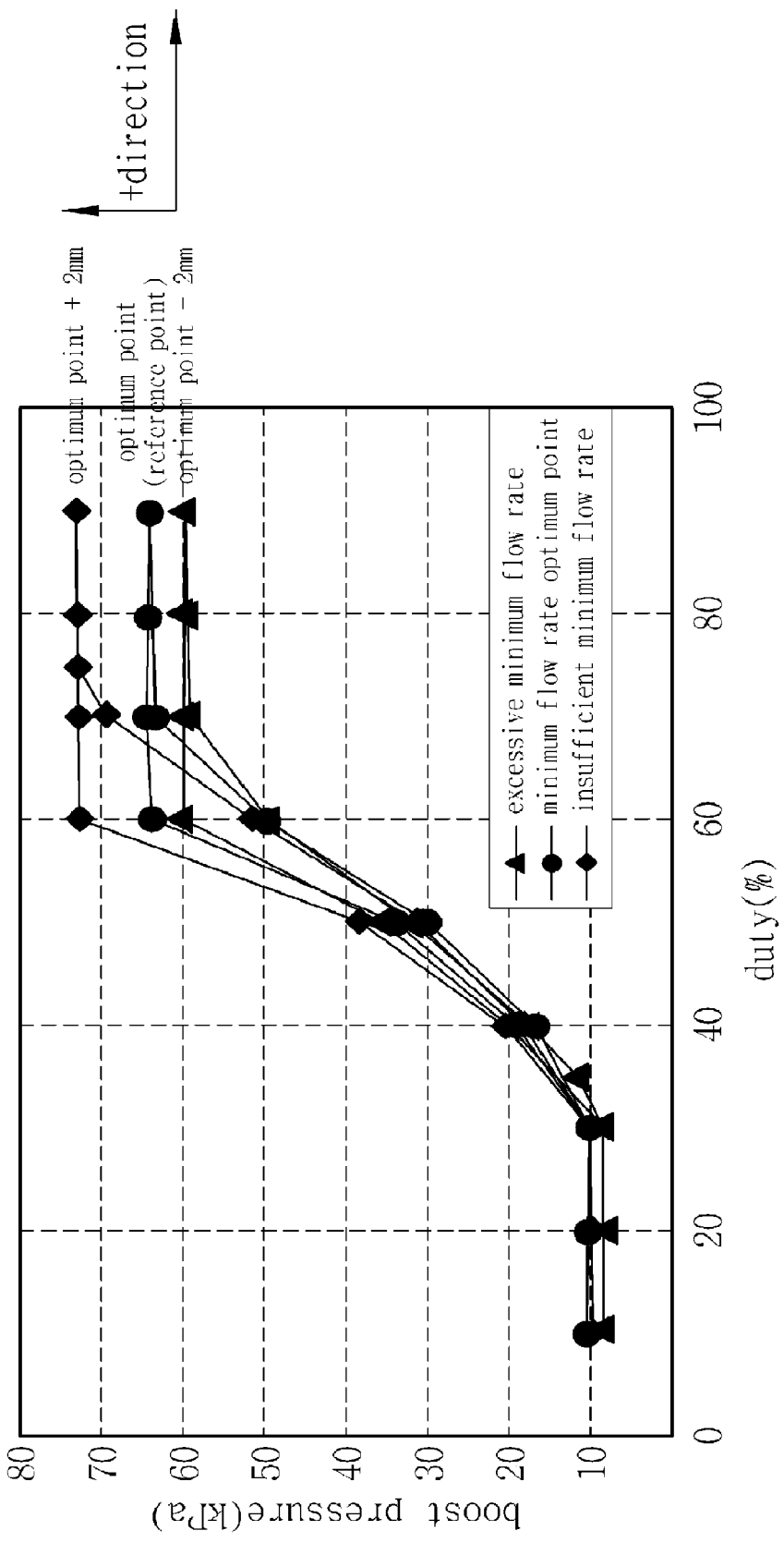
FIGS. 7 and 8 are graphs illustrating the problems in accordance with the conventional art.
Figure 8:
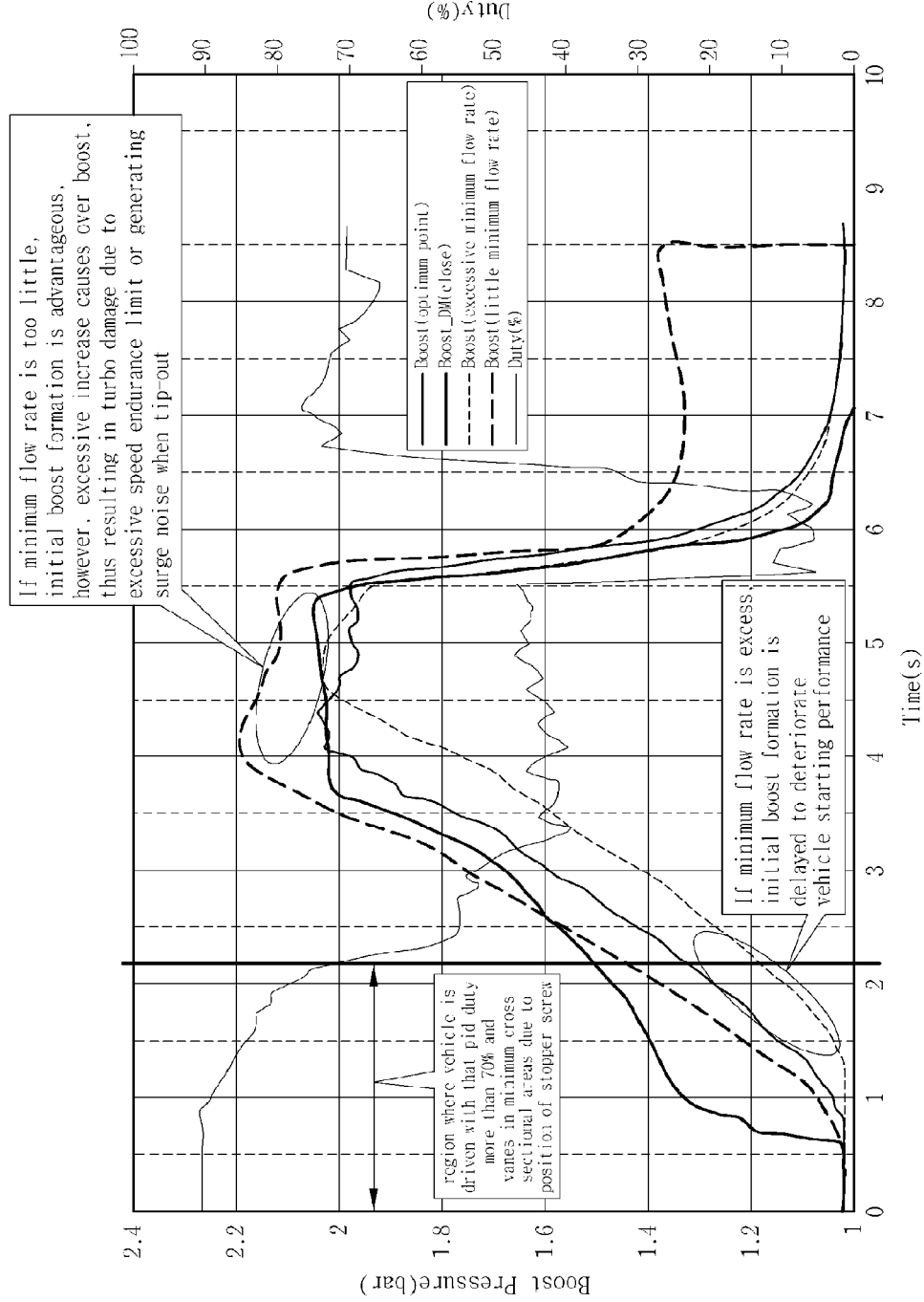

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a system and method for controlling a minimum flow rate of a variable geometry turbocharger aimed at providing a position variable stopper and correcting a minimum flow point of the variable geometry turbocharger using the position variable stopper in order to solve the problems of the deterioration of vehicle starting performance (if the minimum flow rate is greater than an optimum value) and the generation of surge noise and excessive smoke (if the minimum flow rate is smaller than the optimum value), caused in the conventional system in which the minimum flow rate is fixed hardwarely by the stopper in the variable geometry turbocharger mounted in a diesel engine.

First, for an application of the present invention, a stopper 158, which restricts the rotation of a lever 159 of a flow regulator to regulate the limit value of the lever rotation, is established in a structure where its position can be regulated and, particularly, a stopper position regulator 150 regulating the position of the stopper 158 in accordance with a control signal of an ECU 140 is further established.

Figure 9:
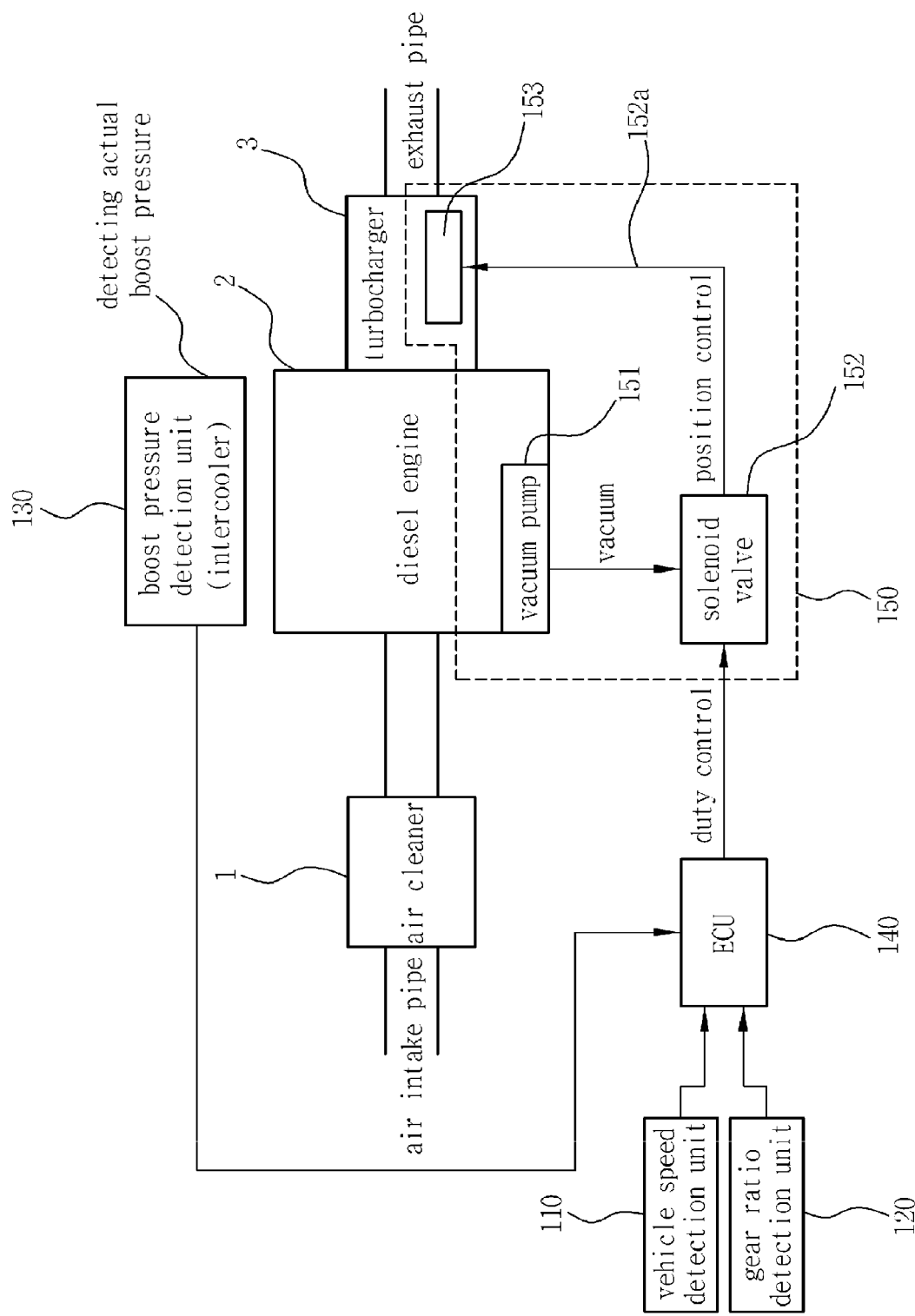
FIG. 9 is a schematic diagram depicting a state where an actuator in a stopper position regulator, an ECU controlling the operation of the actuator and a solenoid valve in accordance with the present invention are connected to each other.
Figure 10:
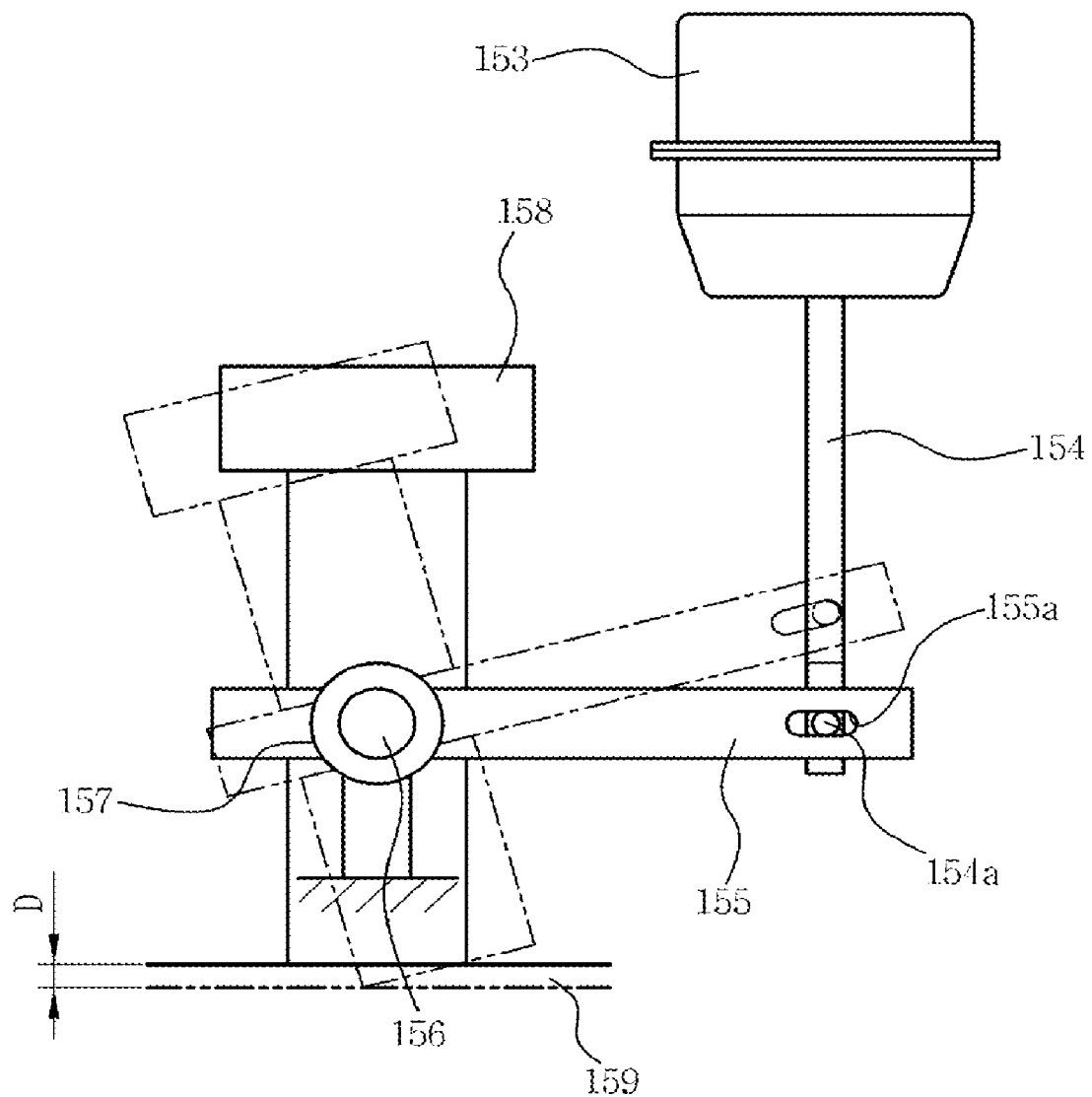
FIG. 10 is a state diagram depicting an actuator in a stopper position regulator and a stopper coupled to the actuator to be position-regulated in accordance with the present invention.

FIG. 9 is a schematic diagram depicting a state where the actuator 153 in the stopper position regulator 150, the ECU 140 controlling the operation of the actuator 153 and a solenoid valve 152 are connected to each other, and FIG. 10 is a state diagram depicting the actuator 153 in the stopper position regulator 150 and the stopper 158 coupled to the actuator 153 to be position-regulated in accordance with the present invention.

As depicted in FIG. 10, the stopper 158 for determining a minimum flow rate as it is in contact with the lever 159 of the flow regulator to restrict the operation of the lever 159 is established integrally with a link 155 connected to an actuator rod 154 of the stopper position regulator 150 by a pin 156.

The link 155 is rotatably coupled to a bushing 157, established fixedly on one side of a turbocharger 3, by means of the pin 156 and, particularly, a hinge pin 154a of the actuator rod 154 is rotatably connected to a slot 155a formed on one end thereof. Accordingly, the link 155 has a clearance in the longitudinal direction with the actuator rod 154 and rotates centering on the hinge pin 154a.

That is, since the link 155 is connected to the hinge pin 154a through the slot 155a, the link 155 is coupled to the actuator rod 154 rotatably having a clearance of a predetermined length in the left and right direction in the figure.

As a result, if the actuator rod 154 moves back and forth in the up and down direction, the actuator rod 154 pushes or pulls one end of the link 155 to rotate the link 155 centering on pin 156 connected to the bushing 157 and, if the link 155 is rotated centering on the pin 156, the stopper 158 is also rotated centering on the pin 156.

Like this, the link 155 functions to rotate the stopper 158 as the actuator 153 moves back and forth and convert the linear movement of the actuator rod 154 into the rotational movement of the stopper 158.

As an end portion of the stopper 158 comes in contact with the lever 159 of the flow regulator, the stopper 158 restricts the position (rotational position) of the lever 159. If the stopper 158 rotates centering on the pin 156, the end portion of the stopper 158 restricting the position of the lever 159 of the flow regulator is varied like 'D' marked in the figure in accordance with the rotated position.

As described above, the present invention controls the back and forth movement of the actuator rod 154 to regulate the rotational position of the stopper 158, thus restricting the rotational position of the lever 159.

Meanwhile, the stopper position regulator 150 regulating the position of the stopper 158 operates according to the control signal of the ECU 140 to regulate the position of the stopper 158. An exemplary embodiment of the stopper position regulator 150 will be described with reference to FIGS. 9 and 10.

First, the stopper position regulator 150 includes the actuator 153 that is established on one end of the turbocharger 3 to regulate the position of the stopper 158 as the front and rear positions of the actuator rod 154 are adjusted.

The actuator 153 may be operated by vacuum pressure provided from a vacuum pump 151 the same as the conventional actuator of the flow regulator used in the general variable geometry turbocharger 3.

That is, the actuator 153 include the actuator rod 154 to which the vacuum pressure acts the same as the conventional actuator of the flow regulator used in the general variable geometry turbocharger 3. If the vacuum pressure is applied to the actuator rod 154 as the vacuum pressure is provided in a pressure chamber in the actuator housing, the actuator road 154 extends a spring mounted therein and moves forward (protrudes downward from the housing in the figure). On the contrary, if the vacuum pressure applied to the actuator rod 154 is lowered relatively, the actuator rod 154 moves backward (inserted upward to the housing in the figure) by the elastic restoring force of the spring.

Consequently, the front and rear positions of the actuator rod 154 are controlled according to the combined force of the vacuum pressure and the spring force by controlling the vacuum pressure provided in the pressure chamber, thus varying the position of the stopper 158.

That is, if the vacuum pressure is additionally applied to the pressure chamber in the actuator housing, the actuator road 154 extends the spring and moves forward to regulate the position of the stopper 158, whereas, if the vacuum pressure applied to the actuator rod 154 is lowered relatively, the actuator road 154 moves backward by the elastic restoring force of the spring to regulate the position of the stopper 158 reversely.

Like this, the actuator 153 of the stopper position regulator 150 regulates the position of the stopper 158 by adjusting the front and rear positions of the actuator rod 154 via the vacuum pressure and the spring force based on the high or low vacuum pressure applied to the pressure chamber, the same as the actuator of the flow regulator.

As depicted in FIG. 9, the vacuum pressure applied to the actuator 153 of the stopper position regulator 150 is supplied from a vacuum pressure supply means, e.g., a vacuum pump 151, in an engine 2. Here, a vacuum pressure supply line 152a is arranged between the vacuum pressure supply means and the actuator 153 to supply the vacuum pressure of the vacuum pressure supply means to the pressure chamber of the actuator 153.

Moreover, the stopper position regulator 150 is controlled by the control signal output from the ECU 140 to regulate the position of the stopper 158. In order to control the operation of the stopper position regulator 150 by the control signal output from the ECU 140 and thereby to regulate the position of the stopper 158, it is necessary to control the vacuum pressure supplied to the actuator 153 of the stopper position regulator 150. To this end, a solenoid valve 152 is established in the vacuum pressure supply line 152a to control the vacuum pressure applied to the actuator 153.

The solenoid valve 152 is opened and closed according to the control signal of the ECU 140 and is, particularly, embodied with a valve, of which opening and closing degrees can be controlled according to a duty signal of ECU 140. If the opening and closing degrees of the solenoid valve 152 are controlled, it is possible to control the vacuum pressure to be supplied to the actuator 153 and, accordingly, the operation of the actuator 153, i.e., the back and forth movement of the actuator rod 154 can be controlled. Consequently, the position of the stopper can be regulated according to the duty signal of the ECU 140.

As depicted in FIG. 9, a system for controlling the minimum flow rate system in accordance with the present invention comprises a vehicle speed detection unit 110 detecting the driving speed of a vehicle, a gear ratio detection unit 120 detecting the gear ratios of the vehicle, a boost pressure detection unit 130, an ECU 140, a stopper position regulator 150 and a stopper 158.

The vehicle speed detection unit 110, the gear ratio detection unit 120 and the boost pressure detection unit 130 are elements already established in the vehicle and those are connected to the ECU 140 to input detected signals. Accordingly, electric signals based on detected values are transmitted to the ECU 140.

Moreover, the ECU 140 calculates a stopper position correction value based on the signals input from the respective detection units 110, 120 and 130 and outputs a control signal for the stopper position correction, if necessary. The stopper position regulator 150 is driven by the control signal to correct the position of the stopper 158.

The regulation process of the position of the stopper 158 performed as the operation stopper position regulator 150 is controlled based on the control signal output from the ECU 140 is the same as described above.

Figure 11:
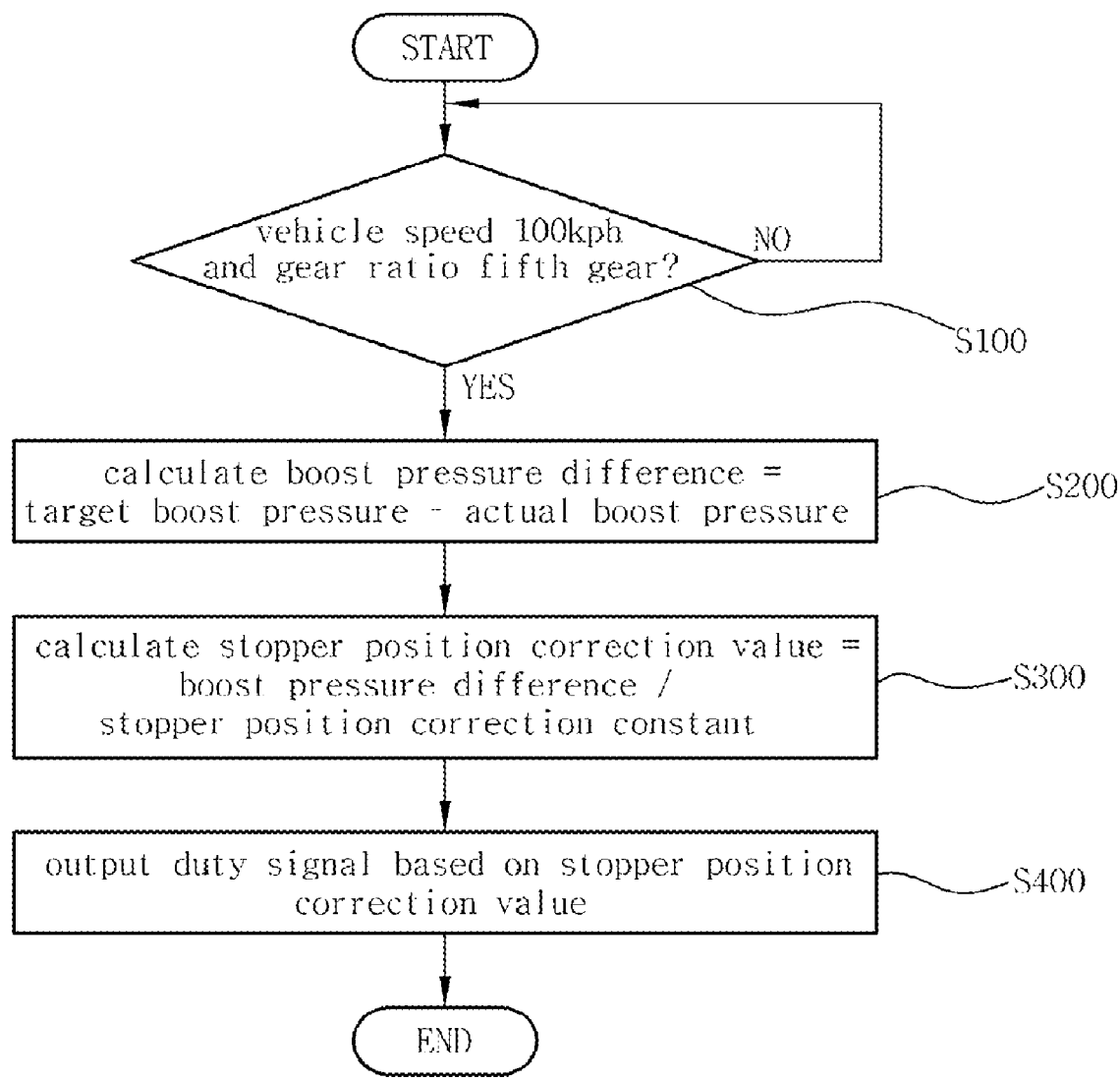
FIG. 11 is a flowchart illustrating the process of controlling a minimum flow rate in accordance with the present invention.

FIG. 11 is a flowchart illustrating the process of controlling a minimum flow rate in accordance with the present invention, and the present invention will be described with reference thereto.

First, the ECU 140 compares the current vehicle speed and the current gear ratio with the signals input from the vehicle speed detection unit 110 and the gear ratio detection unit 120 to determine whether the current vehicle speed and the current gear ratio correspond to a minimum flow learning region (S100).

Here, if the current vehicle speed and the current gear ratio correspond to a predetermined condition, it determines that they correspond to the minimum flow learning region.

For example, if the vehicle speed is 100 km/h and the transmission is in the fifth gear, the ECU 140 determines that they correspond to the minimum flow learning region.

Like this, if the ECU 140 determines that the current vehicle state corresponds to the minimum flow learning region, the ECU 140 determines the current boost pressure (hereinafter, referred to as actual boost pressure) based on the signal input from the boost detection unit 130, compares the detected actual boost pressure with a target boost pressure in the minimum flow learning region based on the vehicle speed and the gear ratio, and calculates the difference between the stored target boost pressure and the detected actual boost pressure (S200).

Next, the ECU 140 calculates a stopper position correction value for correcting the current stopper position, where the actual boost pressure can satisfy the target boost pressure, based on the difference between the target boost pressure and the actual boost pressure using a predetermined stopper position correction constant (S300).

Subsequently, the ECU 140 outputs a control signal for correcting the stopper position, where the actual boost pressure can meet the target boost pressure, based on the calculated stopper position correction value (S400).

Consequently, as the stopper position regulator 150 is operated and controlled by the control signal output from the ECU 140, the stopper 158 moves by the stopper position correction value calculated by the ECU 140, i.e., moves to a position where the actual boost pressure can satisfy the target boost pressure (see FIG. 10).

In a preferred embodiment of the present invention, the ECU 140 duty-controls the stopper position regulator 150 according to the stopper position correction value to accurately correct the current stopper position by the calculated stopper position correction value.

To execute these control processes, data obtained through a test should be input in the ECU 140 in advance. That is, the vehicle speed and the gear ratio conditions corresponding to the minimum flow learning region should be first input and a target boost press in such region should be also input in advance.

Moreover, a relation formula for calculating a stopper position correction value in accordance with the difference between a target boost pressure and an actual boost pressure detected through the boost pressure detection unit 130 in the corresponding region should be input in the ECU 140 in advance in a form defined by a stopper position correction constant obtained through a test.

Here, the formula for calculating the stopper position correction value can be expressed by the following formula 1:

$$\text{Stopper\_delta} = (\text{Boost\_tg} - \text{Boost\_re})/C \quad \text{[Formula 1]}$$

wherein Stopper_delta denotes a stopper position correction value, Boost_tg denotes a target boost pressure, Boost_re denotes an actual boost pressure and C denotes a stopper position correction constant. Here, the stopper position correction constant is a value obtained through a test and is defined as a ratio of a boost pressure variation to a lever limit position variation of the stopper 158.

Figure 12:
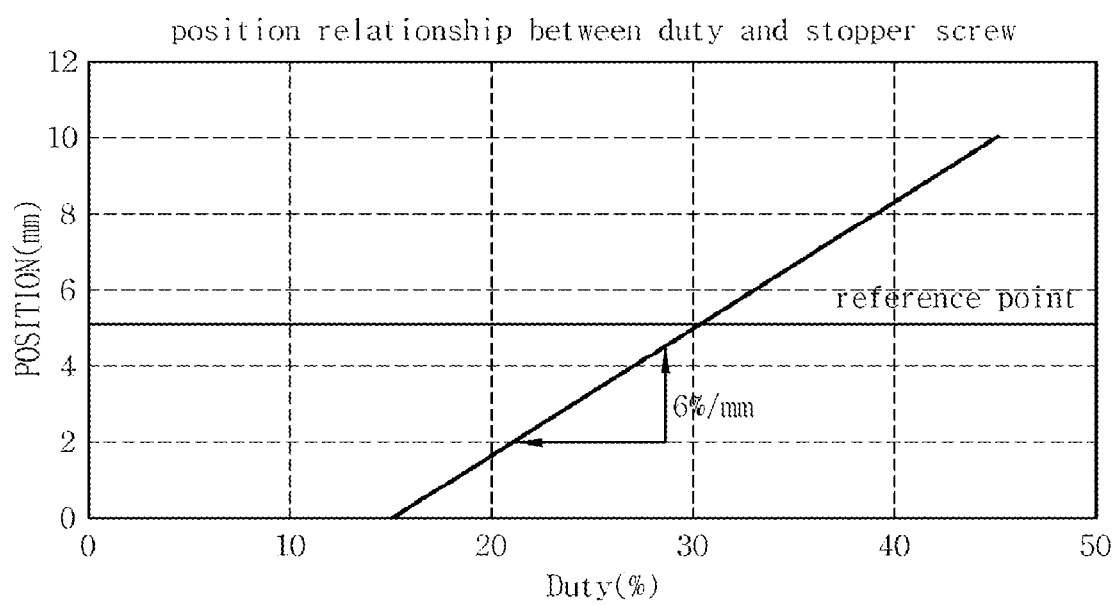
FIG. 12 is a graph showing an example of a position relationship between duties and stopper positions in the present invention.

Furthermore, a relation formula between a duty and a stopper position should be set through a test and input in the ECU 140 in advance so that the ECU 140 can perform the duty control of the stopper position regulator 150 based on the stopper position correction value, that is, so that the ECU 140 can output a duty signal for controlling the stopper position regulator 150 based on the calculated stopper position correction value, as depicted in FIG. 12.

FIG. 12 is a graph showing an example of a position relationship between duties and stopper positions.

The control process in accordance with the present invention will be described taking an example as follows.

In the case where the vehicle speed (Veh_speed) condition and the gear ratio (Gr_ratio) condition, which are directed to a minimum flow learning region, are set at 100 km/h and the fifth gear, respectively, the target boost pressure (Boost_tg) is set at 65 kPa, and the stopper position correction constant (C) obtained through a test is set at 3 (kPa/mm) (boost pressure increased by 3 kPa per+1 mm of the stopper position), if the current vehicle speed and the gear ratio detected by the vehicle speed detection unit 110 and the gear ratio detection unit 120 meet 100 km/h and the fifth gear, and if the actual boost pressure (Boost_re) detected by the boost pressure detection 130 is 59 kPa, the stopper position correction value (Stopper_delta) is (65 kPa−59 kPa)/(3 kPa/mm)=+2 mm by Formula 1 and the duty corresponding to this is +12% (2×6%) as shown in FIG. 12. Consequently, the ECU 140 outputs a duty signal of 72% (basic duty 60%+12%) and, accordingly, the stopper position regulator 150 is operated and controlled by the duty signal to correct the position of the stopper 158 by 2 mm, thus meeting the target boost pressure.

Of course, in this exemplary embodiment in accordance with the present invention, in the case where the ECU 140 regulates the stopper position by controlling the opening and closing degrees of the solenoid valve 152, the duty signal output from the ECU 140 can be regarded as a control signal for duty-controlling the opening and closing degrees of the solenoid valve 152.

As described above, according to the system and method for controlling a minimum flow rate of a variable geometry turbocharger in accordance with the present invention, it is possible to improve the starting performance of a vehicle and prevent the generation of surge noise and smoke remarkably, compared with the convention system in which the position of the stopper is fixed hardwarely. To this end, the system and method of the present invention configures the stopper, which restricts the lever rotation of a flow regulator and determines a minimum flow rate of the turbocharger based on the position that restricts the lever rotation, in a structure where its position can be regulated to control the lever rotation limit position and the minimum flow rate of the turbocharger. Moreover, the system and method of the present invention configures the ECU to calculate a stopper position correction value, with which an actual boost pressure detected by the boost pressure detection unit satisfies a target boost pressure, if predetermined vehicle speed and gear ratio conditions are satisfied, and then to duty-control the stopper position regulator to correct the current stopper position by the calculated stopper position correction value.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A method for controlling a minimum flow rate of a variable geometry turbocharger comprising the steps of:
   determining, at an ECU, whether a vehicle speed and a gear ratio detected by a vehicle speed detection unit and a gear ratio detection unit correspond to a minimum flow learning region satisfying predetermined conditions;
   calculating, at the ECU, a difference between a predetermined target boost pressure corresponding to the vehicle speed and gear ratio conditions and an actual boost pressure detected by the boost pressure detection unit, and then calculating a stopper position correction value for regulating the current stopper position to be a stopper position where the actual boost pressure meets the target boost pressure, if the ECU determines that the vehicle speed and the gear ratio correspond to the minimum flow learning region;
   outputting, at the ECU, a control signal for correcting the current stopper position based on the calculated stopper position correction value; and
   regulating, at the ECU, the stopper position by the stopper position correction value to control the minimum flow rate of the turbocharger as a stopper position regulator is operated and controlled by the control signal output from the ECU.

2. The method for controlling a minimum flow rate of a variable geometry turbocharger as recited in claim 1,
   wherein the stopper position correction value is a value calculated by dividing the difference between the target boost pressure and the actual boost pressure by a stopper position correction constant, and the stopper position correction constant is a value obtained through a test and defined as a ratio of a boost pressure variation to a lever limit position variation of the stopper.

3. The method for controlling a minimum flow rate of a variable geometry turbocharger as recited in claim 2,
   wherein the ECU duty-controls the stopper position regulator based on the calculated stopper position correction value to correct the current stopper position by the calculated stopper position correction value.

4. A system for controlling a minimum flow rate of a variable geometry turbocharger comprising:
   a stopper established in a structure where its position is adjusted to restrict a lever rotation of a flow regulator so as to determine a minimum flow rate of a turbocharger according to a position that restricts the lever rotation, and to restrict the lever rotation and the minimum flow rate of the turbocharger;
   a vehicle speed detection unit detecting a driving speed of a vehicle;
   a gear ratio detection unit detecting a gear ratio of the vehicle;
   a boost pressure detection unit detecting a boost pressure;
   an ECU calculating a stopper position correction value based on signals input from the vehicle speed detection unit, the gear ratio detection unit and the boost pressure detection unit and pre-stored data, and outputting a control signal for correcting the current stopper position by the calculated stopper position correction value, thus controlling the minimum flow rate of the turbocharger; and
   a stopper position regulator regulating the position of the stopper according to the control signal of the ECU.

5. The system for controlling a minimum flow rate of a variable geometry turbocharger as recited in claim 4,
   wherein the stopper position regulator includes an actuator regulating the position of the stopper as a back and forth movement of an actuator rod thereof is controlled.

6. The system for controlling a minimum flow rate of a variable geometry turbocharger as recited in claim 5,
   wherein the actuator is a vacuum pressure operation type actuator, in which the back and forth movement of the actuator rod is controlled according to a state of vacuum pressure supplied through a vacuum pressure supply line from an external vacuum pressure supply means, and
   wherein the vacuum pressure supply line includes a solenoid valve established to control the state of vacuum pressure supplied to the actuator as its opening and closing degrees are controlled according to a control signal output from the ECU.

7. The system for controlling a minimum flow rate of a variable geometry turbocharger as recited in claim 5,
   wherein the stopper is coupled to a link connected to the actuator rod by a pin, a hinge pin of the actuator rod is rotatably connected to a slot formed on one end of the link, and the other end of the link is rotatably connected to a bushing established fixedly on one side of a turbocharger by means of the pin, the stopper being rotated centering on the pin connected to the bushing along with the link to regulate the stopper position when the back and forth movement of the actuator rod.

8. The system for controlling a minimum flow rate of a variable geometry turbocharger as recited in claim 4,
   wherein, if a current vehicle speed and a gear ratio detected by the vehicle speed detection unit and the gear ratio detection unit satisfy predetermined vehicle speed and gear ration conditions, the ECU calculates a difference between a predetermined target boost pressure corresponding to the vehicle speed and gear ratio conditions and an actual boost pressure detected by the boost pressure detection unit and then calculates a stopper position correction value for regulating the current stopper position to be a stopper position where the actual boost pressure meets the target boost pressure.

9. The system for controlling a minimum flow rate of a variable geometry turbocharger as recited in claim 8,
   wherein the stopper position correction value is a value calculated by dividing the difference between the target boost pressure and the actual boost pressure by a stopper position correction constant, and the stopper position correction constant is a value obtained through a test and defined as a ratio of a boost pressure variation to a lever limit position variation of the stopper.

10. The system for controlling a minimum flow rate of a variable geometry turbocharger as recited in claim 4,
    wherein the ECU duty-controls the stopper position regulator based on the calculated stopper position correction value to correct the current stopper position by the calculated stopper position correction value.

* * * * *